April 16, 1935.  D. PARODI  1,998,383
VEGETABLE SLICER
Filed July 19, 1934

WITNESSES
Edw. Thorpe
A. L. Kitchin

INVENTOR
Dagnele Parodi
BY
Munn, Anderson & Liddy
ATTORNEY

Patented Apr. 16, 1935

1,998,383

UNITED STATES PATENT OFFICE 1,998,383

VEGETABLE SLICER

Dagnele Parodi, New York, N. Y.

Application July 19, 1934, Serial No. 736,081

1 Claim. (Cl. 146—146)

This invention relates to vegetable slicers and has for an object to provide an improved, simple construction which will be inexpensive to manufacture but which in use presents an efficient device for readily slicing vegetables in any desired thicknesses or lengths.

Another object of the present invention is to provide a vegetable slicer which will slice potatoes, cabbage, tomatoes, beans or any other vegetables into slices of any desired thickness or length, and which may be mounted on a kitchen table or other support quickly, and quickly removed when not needed.

An additional object, more specifically, is to provide a vegetable slicer having a swinging blade extending through a supporting table, with the parts so arranged that the blade will be guided back and forth past an abutment designed to regulate the thickness of slice, the structure also including means for disengageably connecting the parts to a kitchen table or other support.

In the accompanying drawing—

Figure 2:
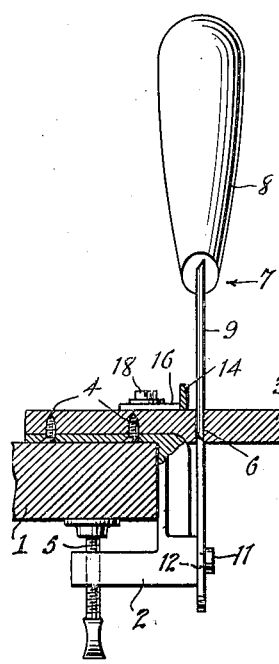
Figure 2 is a sectional view through Fig. 1 approximately on the line 2—2.

Referring to the accompanying drawing by numerals, 1 indicates a table or other support, 2 a bracket, and 3 a platform for receiving vegetables. The bracket 2 as shown in Fig. 2 is secured to the platform 3 by suitable screws 4 so that it is permanently connected therewith but is positioned to straddle part of the table 1 whereby the clamping screw 5 may function to clamp the parts firmly to the table. The platform 3 is provided with a slot 6 extending from near one edge to the other edge of the platform, as shown in Fig. 3, said slot being slightly wider than the blade of the knife 7.

Figure 1:
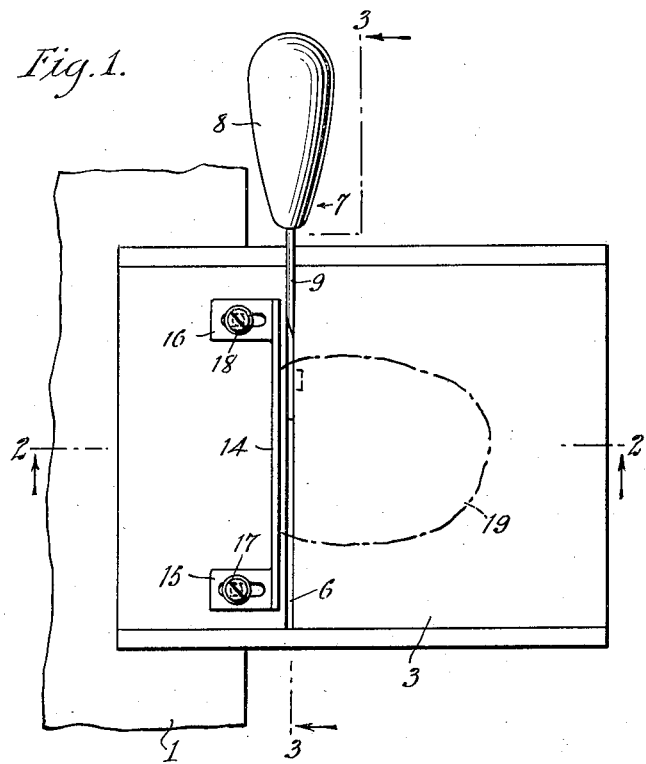
Figure 1 is a plan view of a vegetable slicer disclosing an embodiment of the invention, the same being shown applied to a support.
Figure 3:
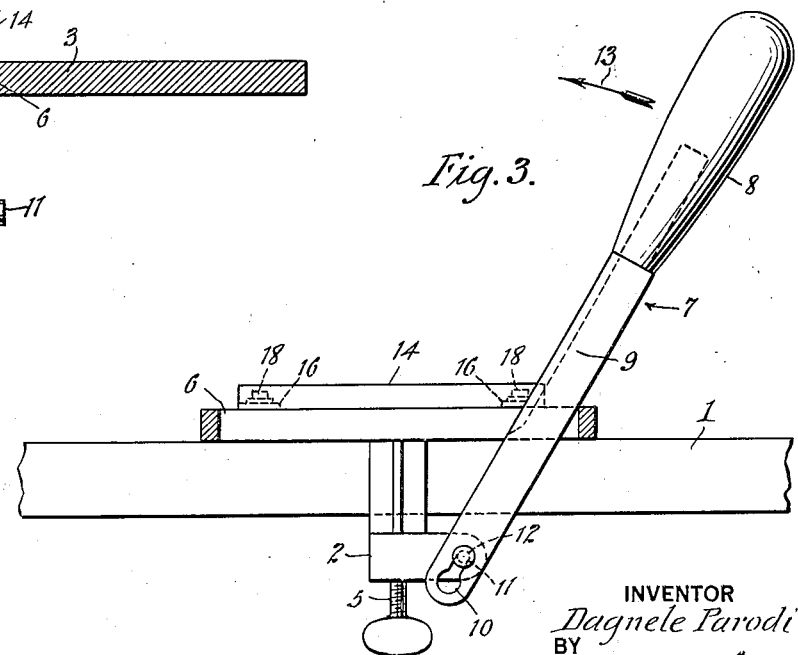
Figure 3 is a sectional view through Fig. 1 approximately on the line 3—3.

A suitable handle 8 is connected to blade 9 which blade is provided with a keyhole opening 10 whereby it may be passed over the enlarged head 11 of the pin 12 and then moved downwardly to the position shown in Fig. 3, whereupon it is mounted to swing back and forth as desired. The blade 9 has only one edge so that it performs the cutting action only as it moves in a direction indicated by the arrow 13. A stop or abutment 14 is provided and is positioned so that the principal part will be parallel with the slot 6. Laterally extending slotted feet 15 and 16 are provided as a part of the abutment 14, and clamping screws 17 and 18 extend through the slots in these feet so as to clamp the abutment at any desired distance from the slot 6, thus varying the size of the slices of the potato 19 or other vegetable being cut. While a potato has been shown in dot-and-dash lines in Fig. 1, it is understood that cabbage, lettuce, onions, beans or any other vegetables may be sliced at any thickness desired by an adjustment of the parts shown in Fig. 1, or at various other thicknesses according to the position of the abutment 14 which may be shifted at any time.

When using the device the potato is placed on the platform 3 and pushed by the hand against the abutment 14. Afterwards the knife is swung over from the position shown in Fig. 3 to the opposite position. This will produce a slice from the potato and when released this slice will fall over the abutment 14, so that the potato may be moved again to a position in engagement with the abutment 14 and a second slice cut. The same action takes place in regard to other vegetables.

Whenever desired the knife may be removed by pulling the same longitudinally until the large part of aperture 6 comes opposite the head 11. The knife is then swung to one side until it is free of the head, after which it is pulled upwardly out of the slot 6.

By unscrewing the clamping screw 5 the entire device may be removed from the table 1 and stored away or disposed of as may be desired. It will be seen that by use of the clamping screw 5 the device may be quickly removed, and also that the knife or cutting structure 7 may be quickly applied and removed, and when applied may function readily to produce the desired slicing or cutting action.

I claim:

A vegetable slicer, comprising a platform having a slot, an adjustable abutment arranged on one side of said slot, said abutment being movable toward and from said slot, means for locking the abutment in different adjusted positions, a substantially U-shaped bracket secured to said platform on the under surface adjacent one end, an arm extending from said bracket, said arm being positioned substantially parallel to said slot, a clamping screw carried by said bracket for clamping the bracket to a support, a pin extending from the free end of said arm, said pin having an enlarged head spaced from said arm, and a knife extending through said slot, said knife at the lower end having an aperture with an elongated portion and an enlarged portion, the enlarged portion of said aperture permitting the end of the knife to be moved over said head and the elongated part of said aperture being of a size to permit the end of the knife to slide over the small part of said pin, whereby the knife is swingably and disengageably mounted on the bracket.

DAGNELE PARODI.